US008844016B2

(12) United States Patent
Peled et al.

(10) Patent No.: US 8,844,016 B2
(45) Date of Patent: Sep. 23, 2014

(54) SYSTEM AND METHOD FOR MONITORING UNAUTHORIZED TRANSPORT OF DIGITAL CONTENT

(75) Inventors: Ariel Peled, Even-Yehuda (IL); Ofir Carny, Kochav-Yair (IL); Lidror Troyansky, Givataim (IL); Oren Tirosh, Nes Ziona (IL); Guy Roglit, Ra'anana (IL); Galit Gutman, Raanana (IL)

(73) Assignee: PortAuthority Technologies, Inc., San Diego, CA (US)

( * ) Notice: Subject to any disclaimer, the term of this patent is extended or adjusted under 35 U.S.C. 154(b) by 0 days.

(21) Appl. No.: 13/590,291

(22) Filed: Aug. 21, 2012

(65) Prior Publication Data

US 2012/0317635 A1 Dec. 13, 2012

Related U.S. Application Data

(62) Division of application No. 12/574,787, filed on Oct. 7, 2009, now Pat. No. 8,281,139, which is a division of application No. 10/003,269, filed on Dec. 6, 2001, now Pat. No. 7,681,032.

(60) Provisional application No. 60/274,657, filed on Mar. 12, 2001.

(51) Int. Cl.
*G06F 9/00* (2006.01)
*H04L 29/06* (2006.01)

(52) U.S. Cl.
CPC ............. *H04L 63/0245* (2013.01); *H04L 63/20* (2013.01); *H04L 63/1416* (2013.01); *H04L 63/123* (2013.01)
USPC ................... 726/11; 726/12; 726/13

(58) Field of Classification Search
USPC .............................. 726/11, 12, 13
See application file for complete search history.

(56) References Cited

U.S. PATENT DOCUMENTS

| 5,043,885 A | 8/1991 | Robinson |
| 5,278,955 A | 1/1994 | Fortéet al. |
| 5,319,776 A | 6/1994 | Hile et al. |

(Continued)

FOREIGN PATENT DOCUMENTS

| DE | 19734585 | 2/1999 |
| GB | 2350747 | 12/2000 |

(Continued)

OTHER PUBLICATIONS

"Entropy Estimation for Real Time Encrypted Traffic Identification" Dorfinger, 2011.*

(Continued)

*Primary Examiner* — Christopher Brown

(57) ABSTRACT

A system for network content monitoring and control, comprising: a transport data monitor, connectable to a point in a network, for monitoring data being transported past said point, a signature extractor, associated with said transport data monitor, for extracting a derivation of said data, said derivation being indicative of content of said payload, a database of preobtained signatures of content whose movements it is desired to monitor, and a comparator for comparing said derivation with said preobtained signatures, thereby to determine whether said payload comprises any of said content whose movements it is desired to monitor. The monitoring result may be used in bandwidth control on the network to restrict transport of the content it is desired to control.

7 Claims, 11 Drawing Sheets

(56) References Cited

U.S. PATENT DOCUMENTS

| | | |
|---|---|---|
| 5,440,723 A | 8/1995 | Arnold et al. |
| 5,444,779 A | 8/1995 | Daniele |
| 5,646,997 A | 7/1997 | Barton |
| 5,870,744 A | 2/1999 | Sprague |
| 5,898,784 A | 4/1999 | Kirby et al. |
| 5,909,493 A * | 6/1999 | Motoyama ................. 713/154 |
| 6,006,332 A | 12/1999 | Rabne et al. |
| 6,055,663 A | 4/2000 | Vogel et al. |
| 6,076,105 A | 6/2000 | Wolff et al. |
| 6,115,533 A | 9/2000 | Tahara et al. |
| 6,167,136 A | 12/2000 | Chou |
| 6,182,157 B1 | 1/2001 | Schlener et al. |
| 6,279,113 B1 | 8/2001 | Vaidya |
| 6,282,175 B1 | 8/2001 | Steele et al. |
| 6,324,650 B1 | 11/2001 | Ogilvie |
| 6,327,677 B1 | 12/2001 | Garg et al. |
| 6,332,030 B1 | 12/2001 | Manjunath et al. |
| 6,370,574 B1 | 4/2002 | House et al. |
| 6,389,476 B1 | 5/2002 | Olnowich |
| 6,389,535 B1 | 5/2002 | Thomlinson et al. |
| 6,430,177 B1 | 8/2002 | Luzeski et al. |
| 6,646,676 B1 | 11/2003 | DaGraca et al. |
| 6,651,099 B1 | 11/2003 | Dietz et al. |
| 6,691,156 B1 | 2/2004 | Drummond et al. |
| 6,725,371 B1 | 4/2004 | Verhoorn, III et al. |
| 6,732,101 B1 | 5/2004 | Cook |
| 6,732,149 B1 | 5/2004 | Kephart |
| 6,826,609 B1 | 11/2004 | Smith et al. |
| 6,920,482 B1 | 7/2005 | Fujiyoshi |
| 7,003,731 B1 | 2/2006 | Rhoads et al. |
| 7,107,618 B1 | 9/2006 | Gordon et al. |
| 7,240,209 B2 | 7/2007 | Carro |
| 7,249,175 B1 | 7/2007 | Donaldson |
| 7,330,970 B1 * | 2/2008 | Field ........................ 713/165 |
| 2001/0025300 A1 * | 9/2001 | Miller et al. ................. 709/206 |
| 2001/0034849 A1 | 10/2001 | Powers |
| 2001/0046069 A1 | 11/2001 | Jones |
| 2001/0049790 A1 | 12/2001 | Faccin et al. |
| 2002/0012443 A1 | 1/2002 | Rhoads et al. |
| 2002/0071556 A1 | 6/2002 | Moskowitz et al. |
| 2002/0078158 A1 | 6/2002 | Brown et al. |
| 2002/0104026 A1 | 8/2002 | Barra et al. |
| 2002/0112015 A1 | 8/2002 | Haynes |
| 2002/0120581 A1 | 8/2002 | Schiavone et al. |
| 2002/0120692 A1 | 8/2002 | Schiavone et al. |
| 2002/0120869 A1 | 8/2002 | Engstrom |
| 2002/0124052 A1 | 9/2002 | Brown et al. |
| 2002/0129140 A1 | 9/2002 | Peled et al. |
| 2002/0140986 A1 | 10/2002 | Takayama |
| 2002/0169954 A1 | 11/2002 | Bandini et al. |
| 2002/0194280 A1 | 12/2002 | Altavilla et al. |
| 2002/0194308 A1 | 12/2002 | Hall |
| 2003/0055907 A1 | 3/2003 | Stiers |
| 2003/0093518 A1 | 5/2003 | Hiraga |
| 2003/0126463 A1 | 7/2003 | Sistla |
| 2003/0135564 A1 | 7/2003 | Tsuchiya |
| 2003/0149732 A1 | 8/2003 | Peled et al. |
| 2003/0152207 A1 | 8/2003 | Ryan |
| 2003/0229673 A1 | 12/2003 | Malik |
| 2004/0025057 A1 | 2/2004 | Cook |
| 2004/0049696 A1 | 3/2004 | Baker et al. |
| 2004/0059786 A1 | 3/2004 | Caughey |
| 2004/0136513 A1 | 7/2004 | Chiu |
| 2004/0177271 A1 | 9/2004 | Arnold et al. |
| 2004/0181581 A1 | 9/2004 | Kosco |
| 2004/0533677 | 11/2004 | Peled et al. |
| 2005/0025291 A1 | 2/2005 | Peled et al. |
| 2005/0138353 A1 | 6/2005 | Spies et al. |
| 2010/0023754 A1 | 1/2010 | Peled et al. |

FOREIGN PATENT DOCUMENTS

| | | |
|---|---|---|
| JP | 11-110556 | 4/1999 |
| JP | 2000-353133 | 12/2000 |
| WO | WO 98/33340 | 7/1998 |
| WO | WO 99/63727 | 12/1999 |
| WO | WO 02/077847 | 10/2002 |

OTHER PUBLICATIONS

Office Action Dated Dec. 23, 2012 From the Israeli Patent Office Re.: Application No. 170428 and Its Translation Into English.
Communication Pursuant to Article 94(3) EPC Dated Aug. 1, 2013 From the European Patent Office Re. Application No. 02715694.2.
Notice of Allowance Dated Apr. 3, 2013 From the US Patent and Trademark Office Re.: U.S. Appl. No. 10/357,201.
Official Action Dated Feb. 22, 2008 From the US Patent and Trademark Office Re.: U.S. Appl. No. 10/003,269.
Official Action Dated Nov. 23, 2005 From the US Patent and Trademark Office Re.: U.S. Appl. No. 10/003,269.
Communication Pursuant to Article 94(3) EPC Dated Nov. 13, 2009 From the European Patent Office Re.: Application No. 02715694.2.
Examiner's Report Dated Jan. 17, 2007 Fron the Australian Government, IP Australia Re.: Application No. 2002225312.
International Preliminary Examination Report Dated Dec. 6, 2002 From the International Preliminary Examining Authority Re.: Application No. PCT/IL02/00037.
International Search Report Dated Jun. 5, 2002 From the International Searching Authority Re.: Application No. PCT/IL02/00037.
Notice of Allowance Dated Jun. 1, 2012 From the US Patent and Trademark Office Re. U.S. Appl. No. 12/574,787.
Notice of Allowance Dated Apr. 7, 2011 From the Canadian Intellectual Property Office Re.: Application No. 2,440,866.
Notice of Allowance Dated Jun. 30, 2009 From the US Patent and Trademark Office Re.: U.S. Appl. No. 10/003,269.
Office Action Dated Jan. 3, 2008 From the Israeli Patent Office Re.: Application No. 157810.
Office Action Dated Feb. 15, 2012 From the Israeli Patent Office Re.: Application No. 170428 and Its Translation Into English.
Office Action Dated Oct. 18, 2009 From the Israeli Patent Office Re.: Application No. 170428 and Its Translation Into English.
Office Action Dated Feb. 20, 2011 the Israeli Patent Office Re.: Application No. 170428 and Its Translation Into English.
Office Action Dated Apr. 27, 2010 From the Israeli Patent Office Re.: Application No. 170428 and Its Translation Into English.
Official Action Dated Jan. 5, 2009 From the US Patent and Trademark Office Re.: U.S. Appl. No. 10/927,044.
Official Action Dated Mar. 5, 2007 From the US Patent and Trademark Office Re.: U.S. Appl. No. 10/003,269.
Official Action Dated Oct. 5, 2011 From the US Patent and Trademark Office Re.: U.S. Appl. No. 10/927,044.
Official Action Dated Jun. 7, 2010 From the US Patent and Trademark Office Re.: U.S. Appl. No. 10/927,044.
Official Action Dated Dec. 8, 2010 From the US Patent and Trademark Office Re.: U.S. Appl. No. 10/927,044.
Official Action Dated Jun. 8, 2009 From the US Patent and Trademark Office Re.: U.S. Appl. No. 10/357,201.
Official Action Dated Mar. 9, 2007 From the US Patent and Trademark Office Re.: U.S. Appl. No. 10/357,201.
Official Action Dated Mar. 9, 2011 From the US Patent and Trademark Office Re. U.S. Appl. No. 12/574,787.
Official Action Dated Aug. 10, 2006 From the US Patent and Trademark Office Re.: U.S. Appl. No. 10/003,269.
Official Action Dated Feb. 10, 2012 From the US Patent and Trademark Office Re.: U.S. Appl. No. 10/927,044.
Official Action Dated Mar. 13, 2009 From the US Patent and Trademark Office Re.: U.S. Appl. No. 10/003,269.
Official Action Dated Nov. 14, 2008 From the US Patent and Trademark Office Re.: U.S. Appl. No. 10/003,269.
Official Action Dated Dec. 16, 2008 From the US Patent and Trademark Office Re.: U.S. Appl. No. 10/357,201.
Official Action Dated Jul. 16, 2007 From the US Patent and Trademark Office Re.: U.S. Appl. No. 10/357,201.
Official Action Dated Nov. 17, 2011 From the US Patent and Trademark Office Re. U.S. Appl. No. 12/574,787.
Official Action Dated Nov. 18, 2009 From the US Patent and Trademark Office Re.: U.S. Appl. No. 10/357,201.

(56) References Cited

OTHER PUBLICATIONS

Official Action Dated Oct. 18, 2010 From the US Patent and Trademark Office Re. U.S. Appl. No. 12/574,787.
Official Action Dated Jan. 19, 2010 From the US Patent and Trademark Office Re.: U.S. Appl. No. 10/927,044.
Official Action Dated May 21, 2008 From the US Patent and Trademark Office Re.: U.S. Appl. No. 10/357,201.
Official Action Dated Jun. 22, 2011 From the US Patent and Trademark Office Re.: U.S. Appl. No. 10/927,044.
Official Action Dated May 23, 2008 From the US Patent and Trademark Office Re.: U.S. Appl. No. 10/927,044.
Official Action Dated May 24, 2007 From the US Patent and Trademark Office Re.: U.S. Appl. No. 10/357,201.
Official Action Dated Aug. 25, 2009 From the US Patent and Trademark Office Re.: U.S. Appl. No. 10/927,044.
Official Action Dated Jun. 25, 2007 From the US Patent and Trademark Office Re.: U.S. Appl. No. 10/003,269.
Official Action Dated May 27, 2011 From the US Patent and Trademark Office Re. U.S. Appl. No. 12/574,787.
Official Action Dated Nov. 29, 2007 From the US Patent and Trademark Office Re.: U.S. Appl. No. 10/357,201.
Official Action Dated Apr. 30, 2012 From the US Patent and Trademark Office Re.: U.S. Appl. No. 10/357,201.
Official Action Dated Jul. 31, 2006 From the US Patent and Trademark Office Re.: U.S. Appl. No. 10/357,201.
Requisition by the Examiner Dated Jun. 2, 2009 From the Canadian Intellectual Property Office Re.: Application No. 2,440,866.
Response Dated Dec. 1, 2009 to Requisition of the Examiner of Jun. 2, 2009 From the Canadian Intellectual Property Office Re.: Application No. 2,220,866.
Response Dated Sep. 1, 2010 to Office Action of Apr. 27, 2010 From the Israeli Patent Office Re.: Application No. 170428.
Response Dated Sep. 1, 2011 to Official Action of May 27, 2011 From the US Patent and Trademark Office Re. U.S. Appl. No. 12/574,787.
Response Dated Nov. 3, 2010 to Official Action of Jun. 7, 2010 From the US Patent and Trademark Office Re.: U.S. Appl. No. 10/927,044.
Response Dated Apr. 4, 2011 to Official Action of Mar. 9, 2011 From the US Patent and Trademark Office Re. U.S. Appl. No. 12/574,787.
Response Dated Apr. 7, 2011 to Official Action of Dec. 8, 2010 From the US Patent and Trademark Office Re.: U.S. Appl. No. 10/927,044.
Response Dated Jul. 7, 2011 to Office Action of Feb. 20, 2011 From the Israeli Patent Office Re.: Application No. 170428.
Response Dated Apr. 14, 2010 to Official Action of Jan. 19, 2010 From the US Patent and Trademark Office Re.: U.S. Appl. No. 10/927,044.
Response Dated Feb. 15, 2010 to Office Action of Oct. 18, 2009 From the Israeli Patent Office Re.: Application No. 170428.
Response Dated Mar. 17, 2010 to Official Action of Nov. 18, 2009 From the US Patent and Trademark Office Re.: U.S. Appl. No. 10/357,201.
Response Dated Jan. 18, 2011 to Official Action of Oct. 18, 2010 From the US Patent and Trademark Office Re. U.S. Appl. No. 12/574,787.
Response Dated Dec. 21, 2011 to Official Action of Oct. 5, 2011 From the US Patent and Trademark Office Re.: U.S. Appl. No. 10/927,044.
Response Dated Sep. 22, 2011 to Official Action of Jun. 22, 2011 From the US Patent and Trademark Office Re.: U.S. Appl. No. 10/927,044.
Response Dated Feb. 24, 2010 to Communication Pursuant to Article 94(3) EPC of Nov. 13, 2009 From the European Patent Office Re.: Application No. 02715694.2.
Translation of Notice of Reason for Rejection Dated Jun. 17, 2008 From the Japanese Patent Office Re.: Application No. 2002-575825.
Translation of Notice of Reason for Rejection Dated Oct. 31, 2008 From the Japanese Patent Office Re.: Application No. 2002-575825.
Luzeski et al.
Sato et al. "Information Distribution Platform Leading the 21st Century Networked Society II, Rights Management", NTT Technical Journal, The Telecommunications Association (TTA), 12(11): 26-30, Nov. 1, 2000.
Examiner's Answer Before the Board of Patents Appeals and Interferences Dated Nov. 6, 2012 From the US Patent and Trademark Office Re.: U.S. Appl. No. 10/927,044.
Official Action Dated Aug. 22, 2012 From the US Patent and Trademark Office Re.: U.S. Appl. No. 10/357,201.

* cited by examiner

SYSTEM AND METHOD FOR MONITORING UNAUTHORIZED TRANSPORT OF DIGITAL CONTENT

RELATED APPLICATIONS

This application is a divisional of U.S. patent application Ser. No. 12/574,787 filed on Oct. 7, 2009, which is a divisional of U.S. patent application Ser. No. 10/003,269 filed on Dec. 6, 2001, now U.S. Pat. No. 7,681,032, which claims the benefit of priority under 35 USC §119(e) of U.S. Provisional Patent Application No. 60/274,657 filed on Mar. 12, 2001. The contents of the above applications are incorporated herein by reference in their entirety.

FIELD OF THE INVENTION

The present invention relates to monitoring transport of digital content, particularly but not exclusively for the enforcement of digital copyright, secrecy and confidentiality.

BACKGROUND OF THE INVENTION

Modern businesses and industries relay heavily on digital media as primary means of communication and documentation. Digital media can be easily copied and distributed (e.g., via e-mail and peer-to-peer networks), and therefore the hazards of business espionage and data leakage are of major concern: Companies are at daily risk of losing sensitive internal documents, leading to substantial financial losses. Banking, legal, medical, government, and manufacturing companies have much to lose if sensitive internal documents are leaked. The safe distribution of internal documents, memos, blueprints, payroll records, patient medical information, banking and financial transactions etc, is becoming more complex to ensure. In fact, as a consequence of such leaks, the United States federal government was prompted to intervene and has mandated that companies should protect sensitive information such as financial and patient medical records. From the companies and businesses standpoint, potential risks include financial losses, fiduciary risks, legal problems, competitive intelligence, public relations problems, loss of clients and privacy liability. There is therefore a great interest in methods that may mitigate digital espionage in particular and confidential data leakage in general.

In addition, unauthorized and/or illegal copying and distribution of multimedia content, such as audio and video, has become highly prevalent in recent years, especially via the Internet. Such unauthorized copying and distribution is an infringement of copyright protection laws and cause financial damage to the rightful owners of the content. It is therefore of great interest to find methods that may stop or at least reduce illegal copying and/or distribution of multimedia files without interfering with legitimate activities.

Most current computer networks security solutions focus mainly on preventing outside penetration into the organization and do not provide an adequate solution to the transfer of sensitive documents originating from within the company. These solutions are usually based on Firewall or Antivirus models that do not stop negligent or malicious email, Web-based mail or FTP file transfers.

Methods and systems for preventing the sending (i.e. outgoing transport) of digital content exist. Some methods assign a digital signature to each file and do not permit sending of a signed document without adequate authorization. However, such methods can easily be circumvented by transforming the content to another format or otherwise changing the content without altering the actual information content. Other known methods use file extension, file size and key word filtering: for example, a filter is set which searches for a predetermined word such as "finance" and prevents any document containing the predetermined word from being sent. Such a filter may be either too selective or too permissive, since the decision is based on scarce information.

Methods for digital rights management (DRM) and digital copyright protection exist. Some methods are designed to control and monitor digital copying of the content. For example, U.S. Pat. No. 6,115,533 describes authentication of an information signal prior to mass duplication of the signal by analyzing the signal to detect the presence or absence of a security signal therein, inserting a security signal into the information signal, and recording the modified signal only if no security signal was detected. U.S. Pat. No. 6,167,136 describes a method for securely storing analog or digital data on a data storage medium: an analog information signal is then combined with a noise signal. The composite noise and information signal is encrypted with a key, which is derived from the noise signal. In U.S. Pat. No. 6,006,332 a system is provided for controlling access to digitized data. In the system, an insecure client is provided with a launch pad program which is capable of communicating with a secure Rights Management server. The launch pad program provides an indicator to a public browser, used by the unsecured client, which acknowledges when a rights management controlled object is detected. While these methods make illegal copying difficult, it is commonly believed that none of the existing methods is effective against a determined and competent opponent. Furthermore, once a certain protection method is cracked, the cracking tools and methods become available to a large community thereby rendering the protection method ineffective.

Methods for usage rights enforcement of digital media in file sharing systems are also known. Some methods are designed to provide protection against centralized file sharing systems, where searching for the desired file is performed using an index that is located in a central server. e.g., the "NAPSTER" file sharing system. In this case, software on the central server can monitor the indexed file and prohibit illegal usage. Such methods require cooperation from the server operator. However, copyright protection against decentralized, "peer to peer" files sharing networks e.g., "Gnutella" and "FreeNet" and document distribution networks e.g. "Internet Newsgroups", as well as protection against centralized file sharing networks without the cooperation of the server operator, are much harder, and these problems are not addressed by current methods.

Other methods attempt to use bandwidth management tools in order to reduce the available bandwidth for multimedia transport in places where such transport is suspected of carrying a large proportion of illegal content. The inspection is performed, in general, in the "application layer". However, such methods are in general not selective enough, that is to say they do not distinguish effectively between legal and illegal (or unauthorized) content, and thus may interfere with legitimate data traffic.

It is foreseeable that as the availability of disk space and bandwidth for data communication increases, unauthorized and illegal distribution of digital content may increase and become more prevalent unless effective counter-measures are taken.

SUMMARY OF THE INVENTION

The present invention seeks to provide a novel method and system for the mitigation of illegal and unauthorized transport of digital content, without otherwise interfering with rightful usage and the privacy of the users. Specifically, the current invention provides methods that allow inspection and analysis of digital traffic in computer networks and automatic detection of unauthorized content within the inspected traffic. The detection method is generally based on extraction of features from the transportation itself that carry information about the specific content (or information which can be used in order to gather such information.) A comparison is then performed with a database that contains features that have been extracted from the copyrighted or confidential items that are to be protected. The inspection and analysis may be performed in various layers of the network protocol layers 2-7 in the OSI model (an hardware implementation may also utilize layer 1) and the coherency between the various layers may be maintained by introducing the concept of an atomic channel, as will be described in more detail below.

Upon detection of illegal transport, the system preferably audits the transport details and enforces transport policy, such as blocking the transport or reduction of the bandwidth available for this transport. To this end, a novel method for bandwidth reduction, that overcomes drawbacks of current methods, is also provided herein. The system may for example be implemented as a firewall or as an extension to existing firewall systems, or in other forms, and can monitor ingoing and\or outgoing transport.

In another embodiment, a database of signatures of confidential, copyrighted, illegal or otherwise restricted materials may be used in order to identify and possibly block the transport of the materials from a restricted zone. Such implementation is important also because the present peer-to-peer networks effectively create an "alternative Internet" that renders many of the current standard firewall techniques ineffective or too untargeted. For example. such a firewall technique may leave the system administrator the option of either completely blocking whole classes of transport or not blocking such traffic as a whole and instead relying on specific data. Specifically, practices based on locating the other party to the communication are often rendered ineffective, due to the pseudo-anonymous nature of particular networks.

The present invention may also be used in combination with certification methods and techniques in order to allow un-inspected, un-restricted or otherwise privileged usage to certificated users.

The present invention can also be used in order to accumulate consumption statistics and/or other useful statistical analysis of the analyzed transport.

According to a first aspect of the present invention there is provided a system for network content monitoring, comprising:

a transport data monitor, connectable to a point in a network, for monitoring data being transported past the point, a description extractor, associated with the transport data monitor, for extracting descriptions of the data being transported, a database of at least one preobtained description of content whose movements it is desired to monitor, and a comparator for determining whether the extracted description corresponds to any of the at least one preobtained descriptions, thereby to determine whether the data being transported comprises any of the content whose movements it is desired to monitor.

Preferably, the description extractor is operable to extract a pattern identifiably descriptive of the data being transported.

Preferably, the description extractor is operable to extract a signature of the data being transported.

Preferably, the description extractor is operable to extract characteristics of the data being transported.

Preferably, the description extractor is operable to extract encapsulated meta information of the data being transported.

Preferably, the description extractor is operable to extract multi-level descriptions of the data being transported.

Preferably, the multi-level description is comprises of a pattern identifiably descriptive of the data being transported.

Preferably, the multi-level description is comprises a signature of the data being transported.

Preferably, the multi-level description comprises characteristics of the data being transported.

Preferably, the multi-level description comprises encapsulated meta-information of the data being transported.

Preferably, the description extractor is a signature extractor, for extracting a derivation of the data, the derivation being a signature indicative of content of the data being transported, and wherein the at least one preobtained description is a preobtained signature.

Preferably, the network is a packet-switched network and the data being transported comprises passing packets.

Preferably, the network is a packet-switched network, the data being transported comprises passing packets and the transport data monitor is operable to monitor header content of the passing packets.

Preferably, the network is a packet-switched network, the data being transported comprises passing packets, and the transport data extractor is operable to monitor header content and data content of the passing packets.

Preferably, the transport data monitor is a software agent, operable to place itself on a predetermined node of the network.

Preferably, the system comprises a plurality of transport data monitors distributed over a plurality of points on the network.

Preferably, the transport data monitor further comprising a multimedia filter for determining whether passing content comprises multimedia data and restricting the signature extraction to the multimedia data.

Preferably, the data being transported comprising a plurality of protocol layers, the system further comprising a layer analyzer connected between the transport data monitor and the signature extractor, the layer analyzer comprising analyzer modules for at least two of the layers.

Preferably, the layer analyzer comprises separate analyzer modules for respective layers.

Preferably, the system comprises a traffic associator, connected to the analyzer modules, for using output from the analyzer modules to associate transport data from different sources as a single communication.

Preferably, the sources include any of data packets, communication channels, data monitors, and pre correlated data.

Preferably, the system comprises a traffic state associator connected to receive output from the layer analyzer modules, and to associate together output, of different layer analyzer modules, which belongs to a single communication.

Preferably, at least one of the analyzer modules comprises a multimedia filter for determining whether passing content comprises multimedia data and restricting the signature extraction to the multimedia data.

Preferably, at least one of the analyzer modules comprises a compression detector for determining whether the extracted transport data is compressed.

Preferably, the system comprises a decompressor, associated with the compression detector, for decompressing the data if it is determined that the data is compressed.

Preferably, the system comprises a description extractor for extracting a description directly from the compressed data.

Preferably, at least one of the analyzer modules comprises an encryption detector for determining whether the transport data is encrypted.

Preferably, the encryption detector comprises an entropy measurement unit for measuring entropy of the monitored transport data.

Preferably, the encryption detector is set to recognize a high entropy as an indication that encrypted data is present.

Preferably, the encryption detector is set to use a height of the measured entropy as a confidence level of the encrypted data indication.

Preferably, the system comprises a format detector for determining a format of the monitored transport data.

Preferably, the system comprises a media player, associated with the format detector, for rendering and playing the monitored transport data as media according to the detected format, thereby to place the monitored transport data in condition for extraction of a signature which is independent of a transportation format.

Preferably, the system comprises a parser, associated with the format detector, for parsing the monitored transport media, thereby to place the monitored transport data in condition for extraction of a signature which is independent of a transportation format.

Preferably, the system comprises a payload extractor located between the transport monitor and the signature extractor for extracting content carrying data for signature extraction.

Preferably, the signature extractor comprises a binary function for applying to the monitored transport data.

Preferably, the network is a packet network, and a buffer is associated with the signature extractor to enable the signature extractor to extract a signature from a buffered batch of packets.

Preferably, the binary function comprises at least one hash function.

Preferably, the binary function comprises a first, fast, hash function to identify an offset in the monitored transport data and a second, full, hash function for application to the monitored transport data using the offset.

Preferably, the signature extractor comprises an audio signature extractor for extracting a signature from an audio part of the monitored data being transported.

Preferably, the signature extractor comprises a video signature extractor for extracting a signature from a video part of the monitored data being transported.

Preferably, the signature extractor comprises a pre-processor for pre-processing the monitored data being transported to improve signature extraction.

Preferably, the preprocessor carries out at least one of: removing erroneous data, removing redundancy, and canonizing properties of the monitored data being transported.

Preferably, the signal extractor comprises a binary signal extractor for initial signature extraction and an audio signature extractor for extracting an audio signature in the event the initial signature extraction fails to yield an identification.

Preferably, the signal extractor comprises a binary signal extractor for initial signature extraction and a text signature extractor for extracting a text signature in the event the initial signature extraction fails to yield an identification.

Preferably, the signal extractor comprises a binary signal extractor for initial signature extraction and a code signature extractor for extracting a code signature in the event the initial signature extraction fails to yield an identification.

Preferably, the signal extractor comprises a binary signal extractor for initial signature extraction and a data content signature extractor for extracting a data content signature in the event the initial signature extraction fails to yield an identification.

Preferably, the signature extractor is operable to use a plurality of signature extraction approaches.

Preferably, the system comprises a combiner for producing a combination of extracted signatures of each of the approaches.

Preferably, the comparator is operable to compare using signatures of each of the approaches and to use as a comparison output a highest result of each of the approaches.

Preferably, the signal extractor comprises a binary signal extractor for initial signature extraction and a video signature extractor for extracting a video signature in the event the initial signature extraction fails to yield an identification.

Preferably, there is a plurality of preobtained signatures and the comparator is operable to compare the extracted signature with each one of the preobtained signatures, thereby to determine whether the monitored transport data belongs to a content source which is the same as any of the signatures.

Preferably, the comparator is operable to obtain a cumulated number of matches of the extracted signature.

Preferably, the comparator is operable to calculate a likelihood of compatibility with each of the preobtained signatures and to output a highest one of the probabilities to an unauthorized content presence determinator connected subsequently to the comparator.

Preferably, the comparator is operable to calculate a likelihood of compatibility with each of the preobtained signatures and to output an accumulated total of matches which exceed a threshold probability level.

Preferably, the comparator is operable to calculate the likelihood of compatibility with each of the preobtained signatures and to output an accumulated likelihood of matches which exceed a threshold probability level.

Preferably, the system comprises a sequential decision unit associated with the comparator to use a sequential decision test to update a likelihood of the presence of given content, based on at least one of the following: successive matches made by the comparator, context related parameters, other content related parameters and outside parameters.

Preferably, the unauthorized content presence determinator is operable to use the output of the comparator to determine whether unauthorized content is present in the transport and to output a positive decision of the presence to a subsequently connected policy determinator.

Preferably, an unauthorized content presence determinator is connected subsequently to the comparator and is operable to use an output of the comparator to determine whether unauthorized content is present in the data being transported, a positive decision of the presence being output to a subsequently connected policy determinator.

Preferably, the policy determinator comprises a rule-based decision making unit for producing an enforcement decision based on output of at least the unauthorized content presence determinator.

Preferably, the policy determinator is operable to use the rule-based decision making unit to select between a set of outputs including at least some of: taking no action, performing auditing, outputting a transcript of the content, reducing bandwidth assigned to the transport, using an active bitstream interference technique, stopping the transport, preventing printing, preventing photocopying, reducing quality of the content, removing sensitive parts, altering the content, adding a message to the content, and preventing of saving on a portable medium.

Preferably, the rule-based decision making unit is operable to use a likelihood level of a signature identification as an input in order to make the selection.

Preferably, a bandwidth management unit is connected to the policy determinator for managing network bandwidth assignment in accordance with output decisions of the policy determinator.

Preferably, there is provided an audit unit for preparing and storing audit reports of transportation of data identified as corresponding to content it is desired to monitor.

Preferably, the system comprises a transcript output unit for producing transcripts of content identified by the comparison.

Preferably, the system comprises a policy determinator connected to receive outcomes of the encryption determinator and to apply rule-based decision making to select between a set of outputs including at least some of: taking no action, performing auditing, outputting a transcript of the content, reducing bandwidth assigned to the transport, using an active bitstream interference technique, and stopping the transport.

Preferably, the rule-based decision making comprises rules based on confidence levels of the outcomes.

Preferably, the policy determinator is operable to use an input of an amount of encrypted transport from a given user as a factor in the rule based decision making.

Preferably, the system comprises a policy determinator connected to receive positive outcomes of the encryption determinator and to apply rule-based decision making to select between a set of outputs including at least some of: taking no action, performing auditing, outputting a transcript of the content, reducing bandwidth assigned to the transport, using an active bitstream interference technique, and stopping the transport, the policy determinator operable to use:

an input of an amount of encrypted transport from a given user, and the confidence level, as factors in the rule based decision making.

According to a second aspect of the present invention there is provided a system for network content control, comprising:

a transport data monitor, connectable to a point in a network, for monitoring data being transported past the point, a signature extractor, associated with the transport data monitor, for extracting a derivation of payload of the monitored data, the derivation being indicative of content of the data, a database of preobtained signatures of content whose movements it is desired to monitor, a comparator for comparing the derivation with the preobtained signatures, thereby to determine whether the monitored data comprises any of the content whose movements it is desired to control, a decision-making unit for producing an enforcement decision, using the output of the comparator, and a bandwidth management unit connected to the decision-making unit for managing network bandwidth assignment in accordance with output decisions of the policy determinator, thereby to control content distribution over the network.

Preferably, the decision-making unit is a rule-based decision-making unit.

Preferably, the transport data monitor is a software agent, operable to place itself on a predetermined node of the network.

Preferably, the system comprises a plurality of transport data monitors distributed over a plurality of points on the network.

Preferably, the transport data monitor further comprises a multimedia filter for determining whether passing content comprises multimedia data and restricting the signature extraction to the multimedia data.

Preferably, the transport data comprises a plurality of protocol layers, the system further comprising a layer analyzer connected between the transport data monitor and the signature extractor, the layer analyzer comprising analyzer modules for at least two of the layers.

Preferably, the system comprises a traffic state associator connected to receive output from the layer analyzer modules, and to associate together output of different layer analyzer modules which belongs to a single communication.

Preferably, one of the analyzer modules comprises a multimedia filter for determining whether passing content comprises multimedia data and restricting the data extraction to the multimedia data.

Preferably, one of the analyzer modules comprises a compression detector for determining whether the monitored transport data is compressed.

Preferably, the system comprises a decompressor, associated with the compression detector, for decompressing the data if it is determined that the data is compressed.

Preferably, one of the analyzer modules comprises an encryption detector for determining whether the monitored transport data is encrypted.

Preferably, the encryption detector comprises an entropy measurement unit for measuring entropy of the monitored transport data.

Preferably, the encryption detector is set to recognize a high entropy as an indication that encrypted data is present.

Preferably, the encryption detector is set to use a height of the measured entropy as a confidence level of the encrypted data indication.

Preferably, the system comprises a format detector for determining a format of the monitored transport data.

Preferably, the system comprises a media player, associated with the format detector, for rendering and playing the monitored transport data as media according to the detected format, thereby to place the extracted transport data in condition for extraction of a signature which is independent of a transportation format.

Preferably, the system comprises a parser, associated with the format detector, for parsing the monitored transport media, thereby to place the extracted transport data in condition for extraction of a signature which is independent of a transportation format.

Preferably, the signature extractor comprises a binary function for applying to the extracted transport data.

Preferably, the binary function comprises at least one hash function.

Preferably, the binary function comprises a first, fast, hash function to identify an offset in the extracted transport data and a second, full, hash function for application to the extracted transport data using the offset.

Preferably, the signature extractor comprises an audio signature extractor for extracting a signature from an audio part of the extracted transport data.

Preferably, the signature extractor comprises a video signature extractor for extracting a signature from a video part of the extracted transport data.

Preferably, the comparator is operable to compare the extracted signature with each one of the preobtained signatures, thereby to determine whether the monitored transport data belongs to a content source which is the same as any of the signatures.

Preferably, the comparator is operable to calculate a likelihood of compatibility with each of the preobtained signatures and to output a highest one of the probabilities to an unauthorized content presence determinator connected subsequently to the comparator.

Preferably, the unauthorized content presence determinator is operable to use the output of the comparator to determine whether unauthorized content is present in the transport and to output a positive decision of the presence to a subsequently connected policy determinator.

Preferably, an unauthorized content presence determinator is connected subsequently to the comparator and is operable to use an output of the comparator to determine whether unauthorized content is present in the transport, a positive decision of the presence being output to a subsequently connected policy determinator.

Preferably, the policy determinator comprises the rule-based decision making unit for producing an enforcement decision based on output of at least the unauthorized content presence determinator.

Preferably, the policy determinator is operable to use the rule-based decision making unit to select between a set of outputs including at least some of: taking no action, performing auditing, outputting a transcript of the content, reducing bandwidth assigned to the transport, using an active bitstream interference technique, stopping the transport, not allowing printing of the content, not allowing photocopying of the content and not allow saving of the content on portable media.

Preferably, the rule-based decision making unit is operable to use a likelihood of a signature identification as an input in order to make the selection.

Preferably, the system comprises an audit unit for preparing and storing audit reports of transportation of data identified as corresponding to content it is desired to monitor.

Preferably, the system comprises a policy determinator connected to receive positive outcomes of the encryption determinator and to apply rule-based decision of the rule-based decision making unit to select between a set of outputs including at least some of: taking no action, performing auditing, outputting a transcript of the content, reducing bandwidth assigned to the transport, using an active bitstream interference technique, stopping the transport, reducing quality of the content, removing sensitive parts, altering the content, adding a message to the content, not allowing printing of the content, not allowing photocopying of the content and not allow saving of the content on portable media.

Preferably, the policy determinator is operable to use an input of an amount of encrypted transport from a given user as a factor in the rule based decision making.

Preferably, the system comprises a policy determinator connected to receive positive outcomes of the encryption determinator and to apply rule-based decision making of the rule-based decision-making unit to select between a set of outputs including at least some of: taking no action, performing auditing, outputting a transcript of the content, reducing bandwidth assigned to the transport, using an active bitstream interference technique, stopping the transport, reducing quality of the content, removing sensitive parts, altering the content, adding a message to the content, not allowing printing of the content, not allowing photocopying of the content, and not allowing saving of the content on portable media.

Preferably, the policy determinator is operable to use:
an input of an amount of encrypted transport from a given user, and
the confidence level,
as factors in the rule based decision making.

The system may typically be comprised within a firewall.

Preferably, the transport data monitor is operable to inspect incoming and outgoing data transport crossing the firewall.

Preferably, the system is operable to define a restricted network zone within the network by inspecting data transport outgoing from the zone.

Preferably the system provides certification recognition functionality to recognize data sources as being trustworthy and to allow data transport originating from the trustworthy data sources to pass through without monitoring.

The certification recognition functionality may recognize data sources as being trustworthy and thus allow data transport originating from the trustworthy data sources to pass through with monitoring modified on the basis of the data source recognition.

The certification recognition functionality may recognize data sources as being trustworthy and use that recognition to allow data transport originating from the trustworthy data sources to pass through with the decision making being modified on the basis of the data source recognition.

According to a third aspect of the present invention there is provided a method of monitoring for distribution of predetermined content over a network, the method comprising:
obtaining extracts of data from at least one monitoring point on the network,
obtaining a signature indicative of content of the extracted data,
comparing the signature with at least one of a prestored set of signatures indicative of the predetermined content,
using an output of the comparison as an indication of the presence or absence of the predetermined content.

According to a fourth aspect of the present invention there is provided a method of controlling the distribution of predetermined content over a network, the method comprising:
obtaining extracts of data from at least one monitoring point on the network,
obtaining a signature indicative of content of the extracted data, comparing the signature with at least one of a prestored set of signatures indicative of the predetermined content,
using an output of the comparison in selecting an enforcement decision, and
using the enforcement decision in bandwidth management of the network.

Preferably, enforcement decisions for selection include at least some of taking no action, performing auditing, outputting a transcript of the content, reducing bandwidth assigned to the transport, stopping the transport, reducing quality of the content, removing sensitive parts, altering the content, adding a message to the content, using an active bitstream interference technique, restricting bandwidth to a predetermined degree, not allowing printing of the content, not allowing photocopying of the content and not allowing saving of the content on portable media.

Preferably, the predetermined degree is selectable from a range extending between minimal restriction and zero bandwidth.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF SPECIFIC EMBODIMENTS OF THE INVENTION

Figure 1:
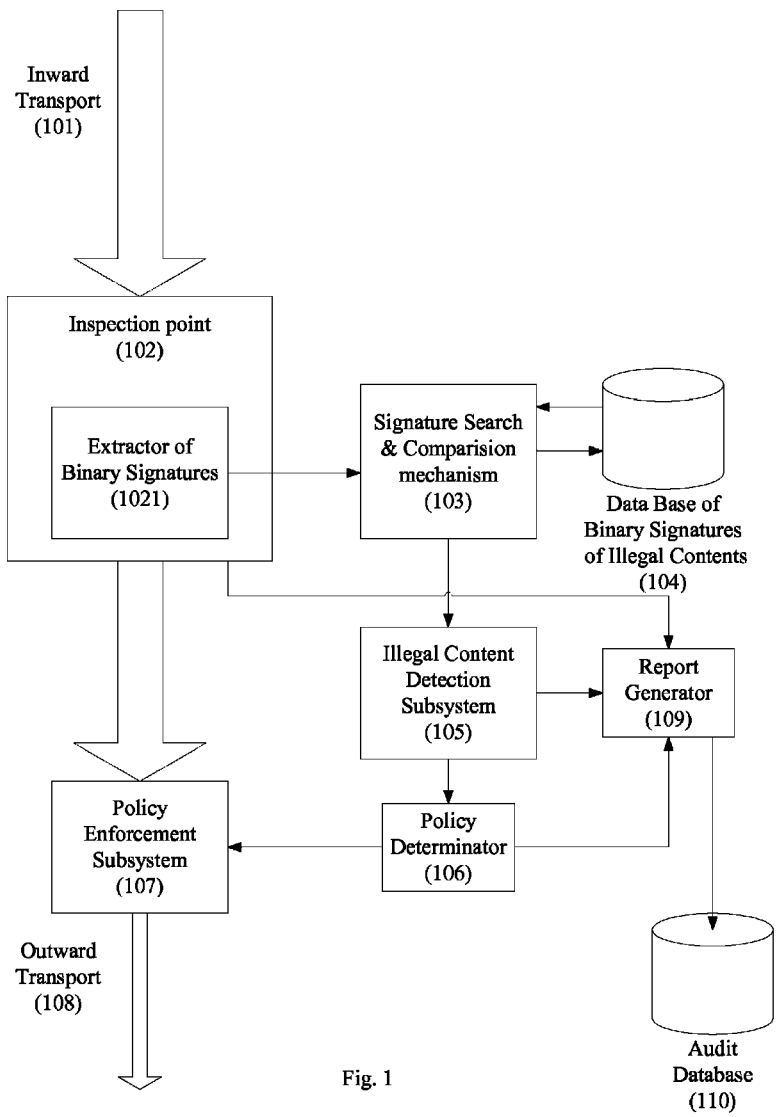
FIG. 1, is a simplified conceptual illustration of a system for detection of unauthorized transport of digital content using transport inspection, constructed and operative in accordance with a preferred embodiment of the present invention.

The present embodiments deal, generally speaking, with protection against unauthorized transport by inspecting the transport in computer networks and applying methods for automatic recognition of unauthorized transport of content, preferably without interfering with rightful usage and the privacy of the users.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is firstly made to FIG. 1, which is a simplified illustration showing a conceptual view of a system for detection of transport of unauthorized content using transport inspection according to a first embodiment of the present invention. An incoming transport 101, which can be a packet transport, but may also be of higher level, e.g., an e-mail message or an e-mail attachment, reaches an inspection point 102, where one or more binary signatures are extracted from an individual packet 1021 of said transport 101.

The inspection point may receive as inputs transport that may or may be a packet stream or any other kind of network data exchange including any other kinds of transport. Depending on the level of the transport, the complete content may be more or less easily accessible. Thus, an E-mail server may have access to entire E-mails, and in many cases may even access individual attachments directly. In certain cases it may even be able to edit such e-mails. In cases where directly accessible and editable content exists, handling may include editing and/or removing and/or replacing parts of the content. The above also applies to semi-directly available content. Thus a message may have MIME encoded attachments which constitute content, and which it may be able to treat in the above manner.

In cases of transport where the received transport is not segmented into packets, or is segmented in an unsuitable manner (e.g. bitstream), segmentation into packets may be achieved arbitrarily, and in such cases the packets inspected at inspection point 102 would not be the packets of the received transport.

The extracted signature is compared to previously extracted illegal content signatures, which have been stored in a preferably pre-sorted database 104. The search and comparison process is performed using a signature search and comparison mechanism 103. Results of the search are used as an input to unauthorized content detection subsystem 106, where an accumulated number of matches may be used to decide if the packets comprise illegal digital content. Alternatively a quantitative measure, or an accumulation of quantitative measures of each match may be used.

Results from the unauthorized content detection subsystem may serve as inputs to a policy determinator 107, which decides, based on the current inputs and a preinstalled set of rules, to enforce a certain policy, such as to block the transport, to reduce the available bandwidth for the transport, to use active methods in order to interfere with the bitstream, only to perform auditing or not to do anything at all. Results from the policy determinator are used to define a policy that is enforced by a policy enforcement subsystem 108. The policy enforcement subsystem 108 may make use of any known methods and techniques for bandwidth management in order to reduce or to stop the outgoing transport 109. Results from the policy determinator 107, the unauthorized content detection subsystem and other relevant data from the inspection point 102 may serve as inputs to an audit generator 109, which prepares an audit that preferably contains details that may be considered relevant for the purposes of the audit, such as content name, source, destination, statistics on events, time, actions and others. Resulting audit reports may thereafter be stored in an audit database 110.

The policy determinator may decide, according to related information, usually gathered from the transport or content, how the inspected transport is to be handled for example should it be blocked, should it be logged, and such handling may be applied even if the transport or content is not explicitly recognized from a signature.

Figure 2:
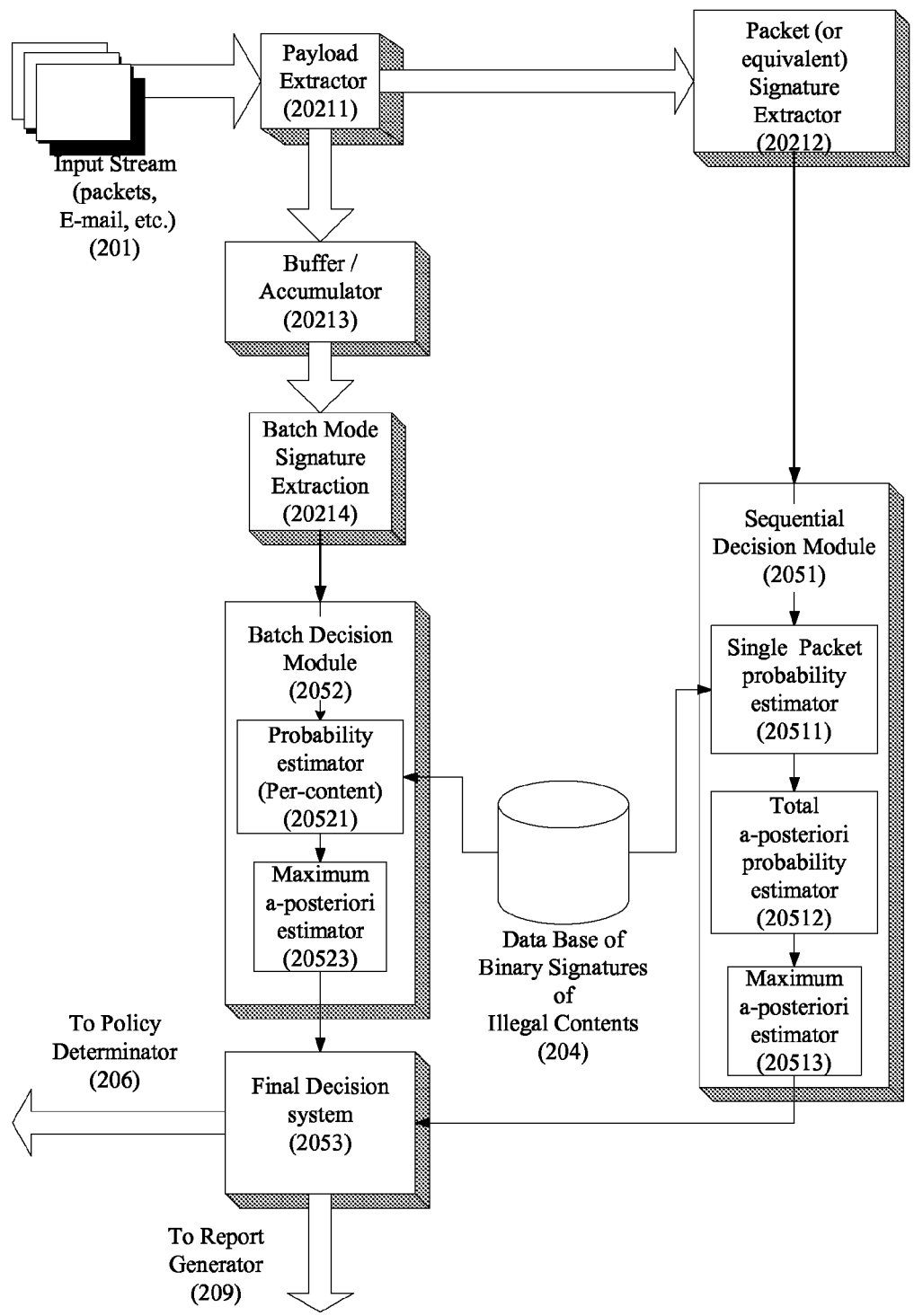
FIG. 2 is a simplified illustration of a part of the embodiment of FIG. 1, for detection of unauthorized transport of digital content, based on binary signatures.

Reference is now made to FIG. 2, which is a simplified block diagram showing parts of the system of FIG. 1 in greater detail. FIG. 2 illustrates a subsystem for detection of the presence of unauthorized content, based on extracted binary signatures. The input stream, that may be the incoming packet stream, serves as an input to the payload extractor module 20211. Content identification is thereafter performed in two different ways. First of all a packet signature extractor 20212 extracts a binary signature from each packet. In a preferred embodiment the signatures are essentially the output of a hash function applied to the binary payload of the packets. The hash function is preferably efficient, but is not necessarily cryptographically secure or collision free. The size of the hashed values is preferably sufficiently large to provide information regarding the content of the packet. A preferred embodiment of the present invention uses a 64 bits CRC as a signature for packets of size 1.5 Kb.

In another preferred embodiment of the present invention a fast hash is used for generating self-synchronized hits. Once a hit is located, a full hash may be calculated on a larger block using the location of the hit as an offset for the middle of a chunk being tested. The full hash should preferably be a true cryptographic hash with at least 128 bits of output. The chunk being tested should be large enough to contain significant entropy even if the file from which it is taken does not have a particularly high entropy density level. A chunk size of 256 bytes±128 bytes around the hit position yields good results while keeping the chance of losing bits across packet boundaries at reasonable levels.

In some cases, inspection of a small number of packets (or an amount of non packetized data) may not provide enough information to identify the content. For example, the representation of the logo of a certain studio in a video file may be the same for many of the movies produced by that particular studio. It is therefore possible to use information gathered from more than one packet in order to identify the content (or an equivalent significant amount of data). In certain cases a confidence level with which identification can be performed, when based on a sample of small size, may be content dependent.

In another embodiment of the present invention, a sequential decision module 2051 uses a sequential decision test E.g., the Neyman-Pearson test, in order to update successively the probability of certain content. The signatures of each packet are compared with the signatures in the database, and each match with any of the pre-stored signatures belonging to a particular content item that is represented in the database increases the likelihood that the data belongs to the matched content. The increase may be content-dependent and therefore the database may also contain content-dependent rules for likelihood updates. The total a-posteriori probability or confidence level may thereafter be estimated 20512 and the maximum a-posteriori estimator 20513 may detect the content to which the inspected data most likely belongs and output its identity and possibly the corresponding confidence level. In addition, packets can be accumulated in a buffer 20213, and the signature can thereafter be extracted in batch mode 20214 from larger chunks of data. It is noted that the present method is less sensitive than that described previously, to variations in the parsing of the data.

The signatures thereafter may serve as inputs to the batch decision module 2052, which estimates the probabilities that the examined data belongs to a certain content that is represented in the database. It is noted that a non-batch decision module can of course be used to replace the batch decision module.

The results from the batch and the sequential decision modules 2051, 2052 may serve as inputs to a final detection system 2053, which preferably estimates the total probability that the examined data belongs to certain content that is represented in the database. The results may serve as inputs to the audit generator 209 and policy determinator 206.

The binary representation of video, audio, still images and other signals depends on the way in which it has been encoded, and therefore the binary signature database preferably includes variations that take into account the different encoding systems, in order to be efficient. However, one cannot expect to have available sample signatures for every content item for every type of encoding. It is therefore preferable to be able to identify the content in a manner that does not depend upon the encoding system. Such an aim may be achieved by decoding the content first and then extracting the signature of the content directly from the decoded video and/or audio and/or still images signal itself.

In some signature schemes it is possible to extract the signature without decoding and/or decompressing the content, or using only partial basic decoding. This is due to the fact that most compression and encoding formats (usually but not always, employing lossy compression. e.g. JPEG, MPEG) are based on the same robust properties as the signature itself may be based upon. In some cases a signature can be designed for easy extraction from a specific format or set of formats.

A similar but in certain respects more complicated case arises from the use of text signatures. With text signatures, (as is often true for other domains), some pre-processing may improve the ability to recognize the signature. The pre-processing may comprise pre canonizing the input. Pre-canonizing may be considered equivalent to filtering, for example filtering out noise, low pass filtering, etc. Pre-canonizing may be applied to audio, video or still content before extracting the signature, which may be included with any the following: removing formatting information (white space, fonts, etc.) whether partly or fully, removing redundancy which may easily be changed, canonizing or correcting spelling, transforming to another (usually more compact) notation (e.g. phonetic) in which closely comparable elements may be equivalent.

A similar case arises with the handling of computer program code or raw data (e.g spreadsheets, data files) The skilled person will appreciate that the significance of changes or alterations in such data is dramatically different than for text. For example a different spelling may cause different program behavior. In the case of such data types, cannonization may for example consist of removing comments and generally consists of semi-intelligently parsing the content.

As discussed above, there are several methods for extracting signatures, and each method may be used alone. In addition it is possible to use different combinations of the extraction methods to extract useful information, and in such a case the most useful result over all the different methods is accepted. In an alternative embodiment, information from the different methods may be combined to produce an overall signature.

Figure 3:
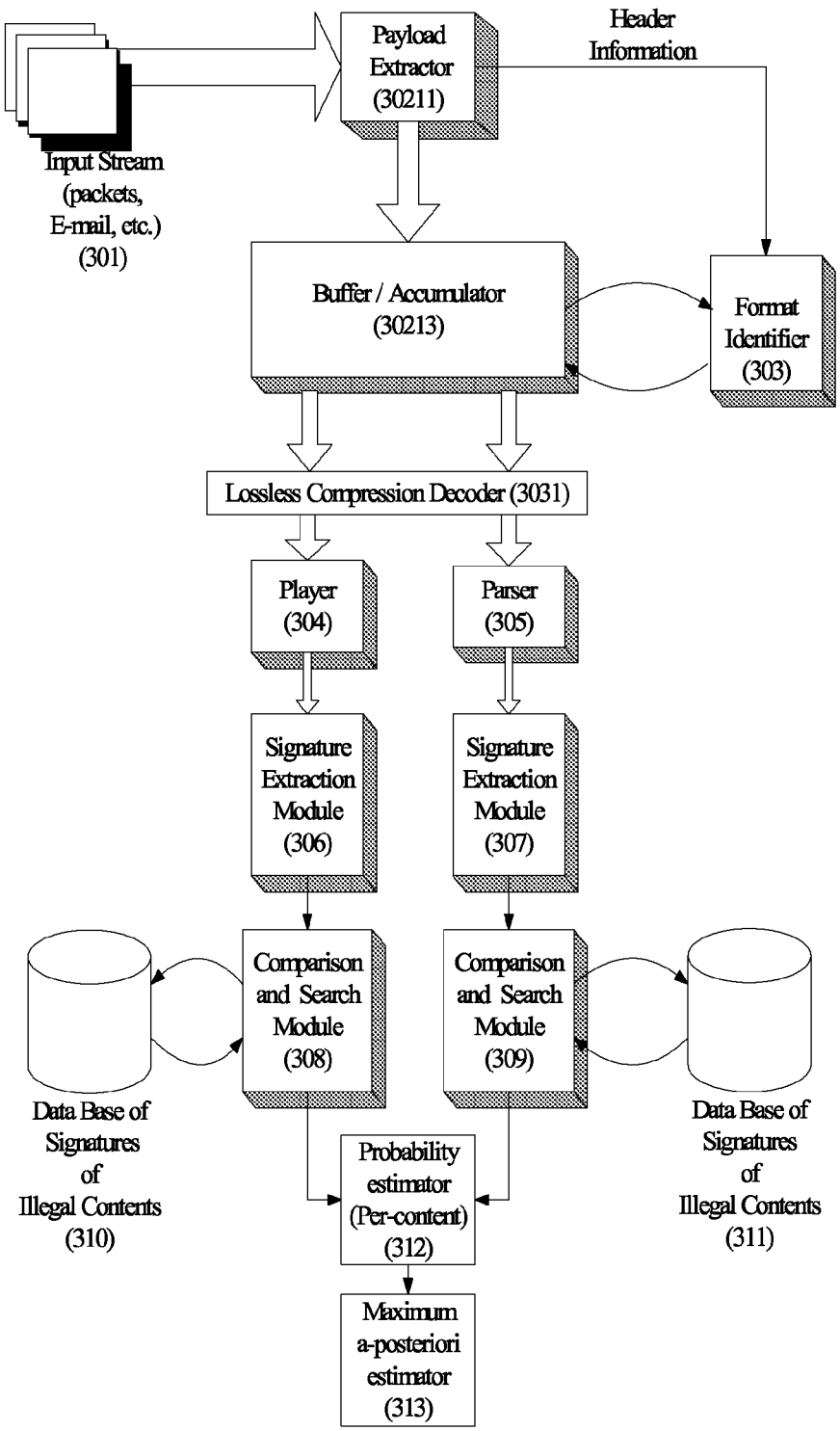
FIG. 3 is a simplified illustration of an alternative to the part of FIG. 2, for detection of unauthorized transport of digital content, based on the signatures of the audio\video signal.

Reference is now made to FIG. 3, which is a simplified block diagram showing schematically an arrangement for carrying out content identification based on a video and/or audio signature. The input stream 301 arrives in packet form (or other suitable form), from which the content or payload is extracted by a payload extractor 30211 and is accumulated at a buffer 30213. The format of the content is thereafter identified at a format identifier 303, using information from the payload and/or from packet headers. If the content is compressed using a standard compression system e.g., "zip", the content is first opened or uncompressed using a decompressor 3031.

Following opening, there are two preferred possibilities for proceeding: A first possibility is to extract parameters directly from the bitstream using a parser 305. A second possibility is to render the content using a multimedia player 306. In preferred embodiments both possibilities are provided and a decision as to which of the two to use in any given instance is preferably taken based on the content type.

The content signature is extracted using the relevant signature extraction module, 306 or 307. The extracted signatures are thereafter compared with signatures in the corresponding databases 310 and 311 using the respective comparison and search modules 308 and 309. Methods for obtaining signatures of the original content and performing searches are described, e.g., in U.S. Pat. Nos. 6,125,229, 5,870,754 and 5,819,286, the contents of which are hereby incorporated by reference.

Preferably, the signature comparison yields probabilities that the content belongs to any of the contents represented in the database. Such probabilities are thereafter estimated for each of the signatures or for a subset of the signatures by probability estimator 312 and a most likely content item is identified using the maximum likelihood estimator 313.

Since the extraction and the comparison of binary signatures is far more simple then the extraction and the comparison of audio and video signatures, the above identification method will, in general, be employed only if the suspected content has not been identified using binary signatures as described above in respect of FIG. 1.

Figure 4:
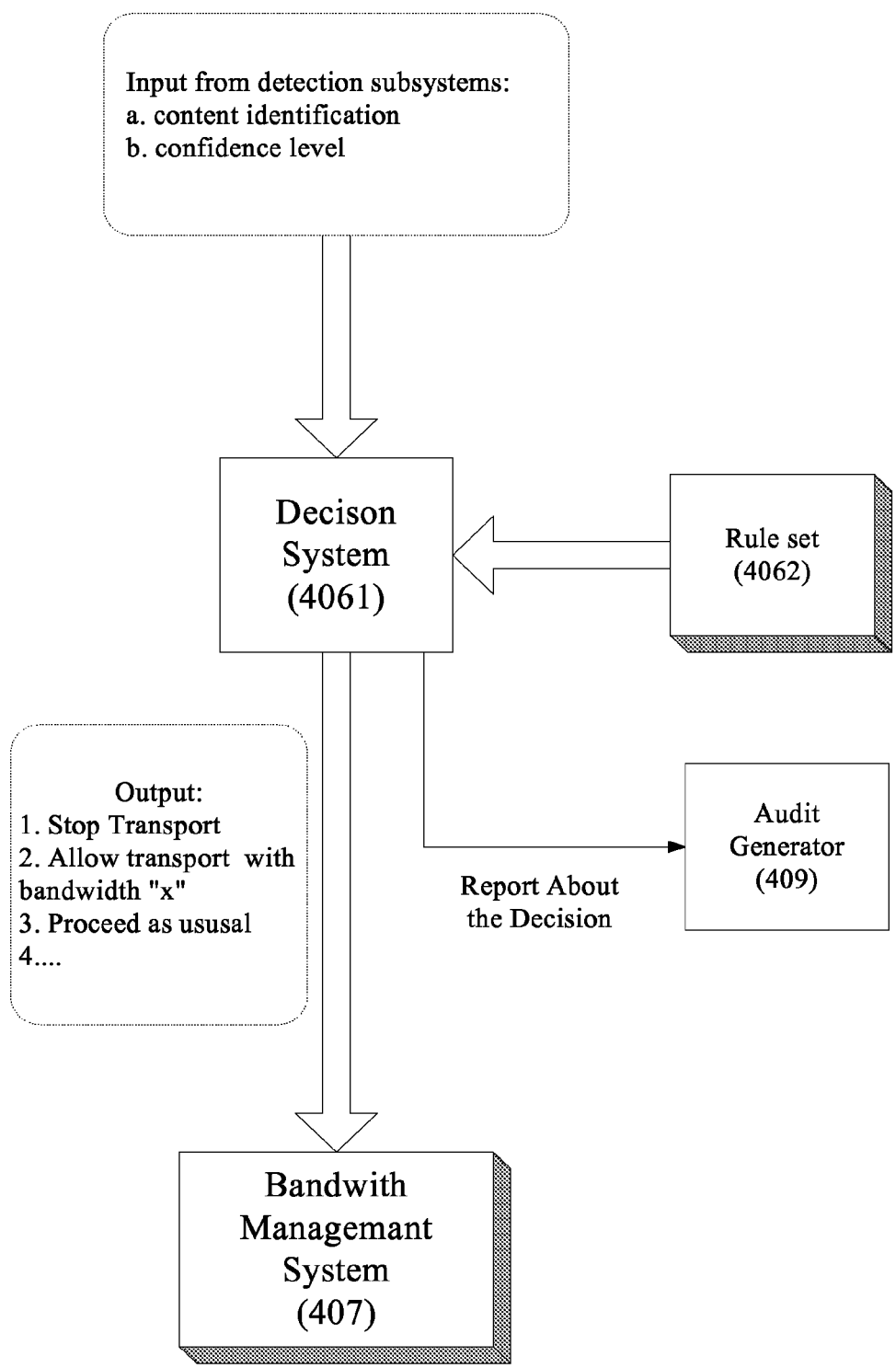
FIG. 4 is a simplified illustration of a decision-making subsystem for use in the embodiment of FIG. 1.

Reference is now made to FIG. 4, which is a simplified block diagram of the policy enforcement subsystem 107 of FIG. 1. The policy enforcement subsystem 107 receives as input the identification of unauthorized content that was found in previous stages, together with a corresponding confidence level. Decision system 4061 uses a rule-set 4062 in order to take into consideration various parameters, such as the confidence level. Thus for example a very simple rule based on the confidence level may be as follows:

for low confidence level—take no action,
for intermediate confidence level—allow transport with a reduced bandwidth, where the bandwidth reduction depends on the confidence level, and
for high confidence level, completely stop the transport.

Sometimes it may be possible to only stop part of the transport (e.g. an E-mail attachment) or to edit some of its contents (e.g. reduce the quality of copyrighted material).

Another parameter that may be taken into account is the content identity itself, as certain content items may be of more concern than others. For example, a particular publisher may be highly concerned about distribution of a content item at an early stage of illegal distribution, or may be particularly concerned to stop the distribution of a content item whose production required a large amount of money or has only recently been released. Other factors to be considered may include a desire to give the system of the present embodiments a low profile in order to reduce the probability of counter measures, to protect the credentials of the source and the destination of the transport etc.

One possible final decision of the system may be to completely stop the transport whether immediately or after crossing a threshold such as a time threshold. Another possibility is to allow the transport to continue with reduced bandwidth, and another possible decision is to take no action and to allow the transport to proceed as usual. After the decision, the corresponding allocated bandwidth is preferably attached to the packets, typically in a packet header. The decision, in terms of an allocated bandwidth, may serve as an input to a bandwidth management system 407 and to an audit generator 409.

Once a bandwidth level or a priority or any other form of decision has been allocated, the system may make use of any one of various bandwidth management tools in order to execute the policy, e.g., the methods described in U.S. Pat. Nos. 6,046,980, 6,085,241, 5,748,629, 5,638,363 and 5,533,009, the contents of which are hereby incorporated by reference.

Figure 5:
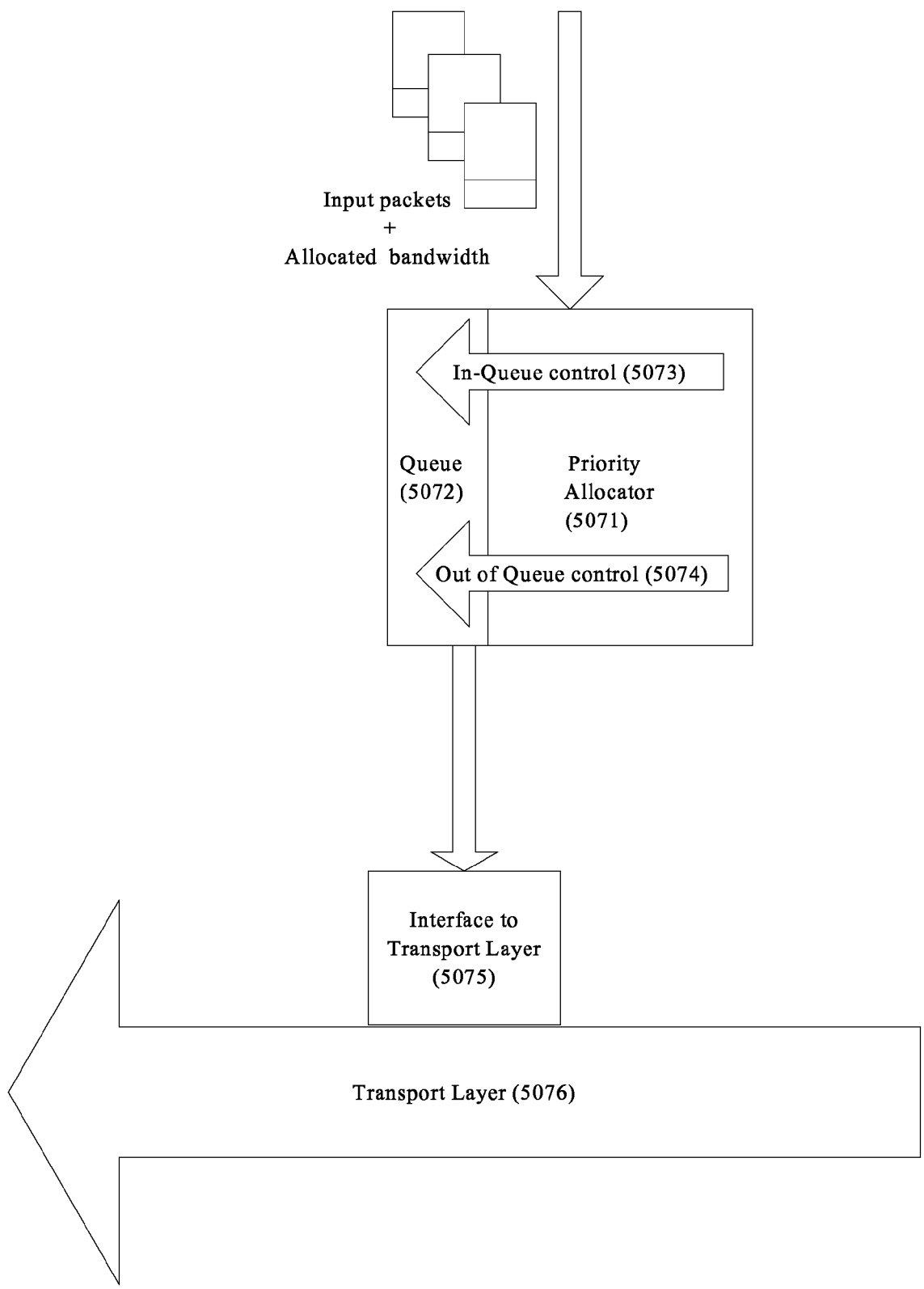
FIG. 5 is a simplified illustration of a part of the system of FIG. 1, for policy enforcement using bandwidth management.

Reference is now made to FIG. 5, which is a simplified schematic illustration of a subsystem for policy enforcement using a standard bandwidth management tool. Input packets (or an equivalent suitable format in a suitable medium), possibly carrying indications of a corresponding allocated bandwidth, serve as an input to a priority allocator 5071, which preferably determines either the order in which the packet enters a queue 5073 for output, or the order in which the packets leave the queue 5074 for output. The packets preferably leave the queue at a rate that corresponds to the allocated bandwidth, and reach the interface to the transport layer 5075 and then the transport layer itself—5076.

Figure 6:
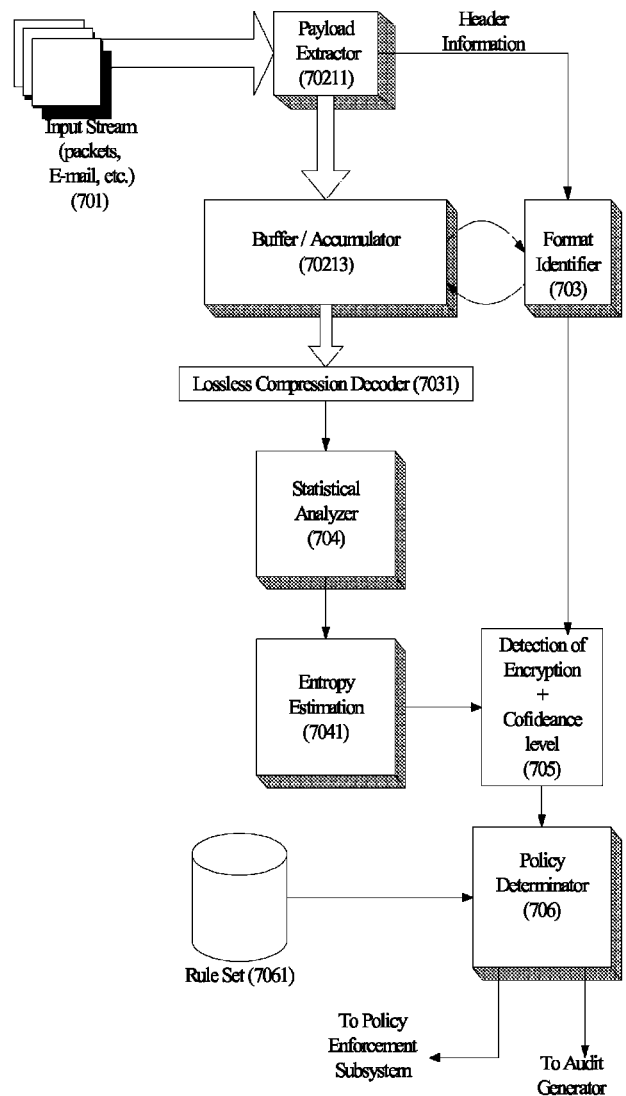
FIG. 6 is a simplified illustration of a subsystem for automatic detection of encrypted content, for use in the embodiment of FIG. 1.

The above-described embodiments provide a solution for content that is not encrypted. However, unauthorized users may easily circumvent the above system using standard encryption methods. Very strong cryptographic software is prevalent on the Internet, and it is practically impossible to decrypt such content without having a respective decryption key. Reference is now therefore made to FIG. 6, which is a simplified block diagram illustrating a subsystem for detection of encrypted content. The subsystem preferably determines the presence of encrypted content on the basis of information in the packet header and on the statistics of the payload. In many cases e.g., SSL and TLS, the headers contain information about the encryption method, and identification of the encrypted content can be done based on the header information alone. A format identifier 703 is accordingly provided to carry out identification of such information in the header. In other cases, the statistics of the payload may be used in order to determine whether the content is encrypted or not. In general properly encrypted data tends to have a statistical distribution of maximal entropy, which is to say minimal redundancy. Thus an entropy measurement can be used as an indication of the presence of encrypted data. In order to carry out an entropy measurement, a portion of the content is accumulated in a buffer/accumulator 70213. An encoding format, if indicated in the header information, is identified by the format identifier 703. If the content has been compressed using a standard (usually lossless) compression method, e.g. "zip", then it may first be decoded using a multi-format lossless compression decoder (or a decoder for the specific format) 7031. The statistics of the content is thereafter analyzed using a statistical analyzer 704 and the entropy of the bitstream is estimated 7041. Detection of encrypted content and a corresponding confidence level for that detection are thereafter estimated using standard statistical tests for randomness, possibly taking into account inputs from the format identifier.

In some cases the above analysis can be done without decompressing the file, usually based on the fact that most lossless compression algorithms are based on entropy considerations for bit allocation and similar concerns.

The policy determinator 706, which may be the same as policy determinator 106 in FIG. 1, preferably uses inputs including the encrypted content detection decision with the rules in the rule set 7061 in order to determine a corresponding enforcement policy.

In general, encrypted content that corresponds to legitimate transportation between ordinary users is expected be of significantly smaller volume then the transportation volume that is used while exchanging illegitimate video content and multiple audio content. So a reasonable policy, that can reduce transportation of unauthorized multimedia content, with minimal interference to legitimate users, would be to allow a constant quota for encrypted transport, for example a few Mbs for an ordinary user. If the quota is exceeded then the allocated bandwidth may be significantly reduced or, alternatively, an extra charge may be levied.

Figure 7:
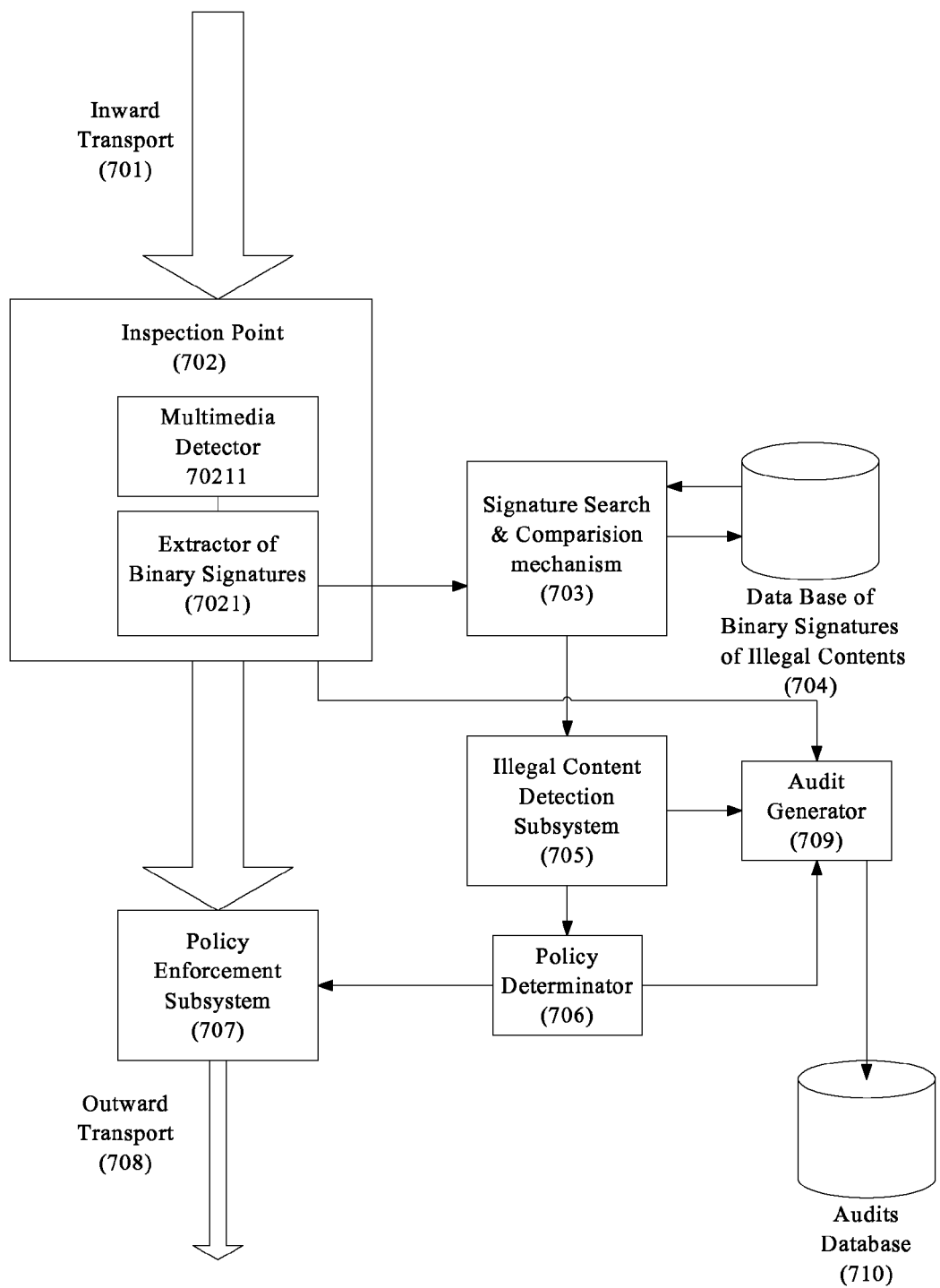
FIG. 7 is a simplified block diagram of an alternative embodiment of the present invention that uses a module that filters multimedia content for further inspection.

Note that for many applications a more selective approach may be taken, for example, in the case of sensitive confidential content, bandwidth is not generally a consideration, and the primary decision is whether to allow or to block the transport Reference is now made to FIG. 7, which is a simplified block diagram of a further embodiment of the present invention. The embodiment of FIG. 7 is similar to that of FIG. 1, but additionally comprises a multimedia detector 70211 that filters arriving packets for multimedia content. As a result of the application of the filter, it is possible to isolate the multimedia content for inspection for binary signatures etc., thereby reducing the load on consequent stages. Detection of multimedia content is preferably carried out on the basis of the information in the file, packet or other entity header.

The multimedia detector 70211 is preferably located at an inspection point 702. The inspection point 702 is preferably otherwise identical to the inspection point 102 of FIG. 1. The remainder of FIG. 7 is the same as FIG. 1 and will not be described again.

Figure 8:
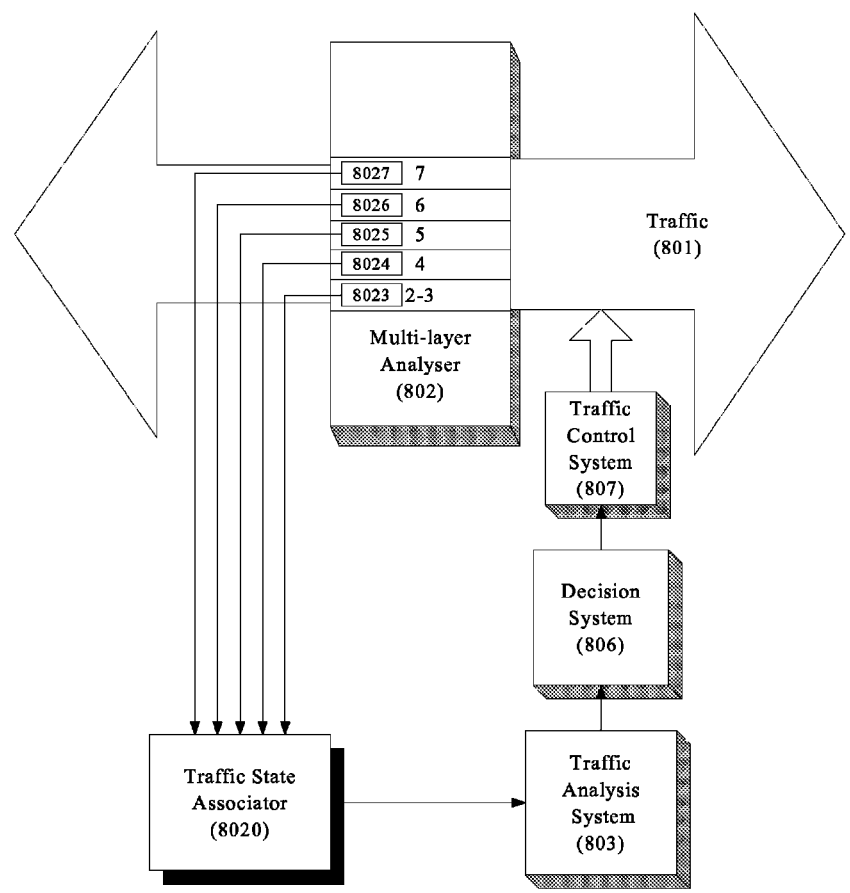
FIG. 8 is a simplified schematic diagram of a further alternative embodiment of the present invention, which performs multi-layer analysis of data traffic and maintains coherency between the various transport layers by introducing a concept referred to herein as an atomic channel.

Reference is now made to FIG. 8, which is a simplified schematic diagram showing an arrangement for inspecting traffic content over a variety of protocol layers. In general, network traffic may be addressed in various layers. The standard ISO OSI (open system architecture reference model) introduces seven protocol layers: physical, data-link, network, transport, session, presentation and application. In order to gather more information and to increase the reliability of the analysis, traffic analysis may be performed at several of the protocol layers. However, having analysis results from different layers raises a problem known as the association problem, namely how to gather the different analysis results from the various layers and associate them together to draw conclusions regarding transfer of possibly unauthorized content.

In order to deal with the above-described association, a preferred embodiment of the present invention introduces a concept, which is referred to herein by the term atomic channel. Generally, a single communication between two parties may comprise one or more links and numerous data and control packets. The atomic channel is the single communication comprising all of these parts. Information in the various packet headers, at different levels or layers of the transport protocol allows the different packets (or other elements) of a single communication to be associated together. In order to achieve such an association an atomic channel is given a traffic state which enables it to achieve the above-mentioned association, as will be described in more detail below. A simple atomic channel may, for example, be a single TCP connection. The skilled person will of course be aware that in many current file sharing schemes the TCP connections are considered sub atomic, for example in an FTP transfer, two such connections, DATA and CONTROL, are used, the two connections together forming one atomic channel. More complex examples include file-sharing networks, where monitored connections may contain information pertaining to many transfers, between many users, none of the users being on either end of the connection. Furthermore, multiple unrelated, monitored, connections may contain information about a single transfer. The information in all of the unrelated connections may thus need to be correlated in order to obtain information about the transfer, and such correlation may need to be carried out in an uncertain or untrustworthy environment. The uncertainty may be due to incomplete monitoring, or efforts by the designers or users of the network to thwart monitoring of the network.

In the example of a single TCP connection, the participants' IP addresses may be gathered from layer 3 information. Layer 4 information may be used to determine information about a second stream, that is to say to find signs of use of a two way channel, so that the entire interaction may, according to the situation, be completely reconstructed. In other circumstances, fragments of the streams may be reconstructed. The skilled person will be aware that state information is important, both to construct the streams, and to correlate them with each other. State information may be especially useful as a basis for understanding connection negotiation information, which may be, and preferably often is, analyzed as higher OSI layer information. For example in the case of an FTP transfer, the control information stream may be used to attach a file name and location to the transferred file and may be used to discern between numerous files. In the case of a complex file-sharing network, high-layer state information may be used to correlate between high-layer messages of the network, additional information may be used to discern the contents encoding, or encryption if present. Such additional information may be taken from layers 5 and 6 and sometimes from layer 7, particularly in the case of a virtual file-sharing network.

In cases such as that of a peer-to-peer network, alternatively or additionally to using the above-described atomic channel, information may be gathered about separable but possibly unrecognizable entities. Thus, over the course of the monitoring, enough information may be gathered to obtain a meaningful notion of the transfer, and/or on the structure and/or of the aforementioned entities.

Returning to FIG. 8, there is illustrated therein an arrangement for carrying out multi-layer inspection of a transport protocol. Two-way or sometimes multi-way traffic 801 may be gathered from a point or agent on the network being monitored. The system preferably makes use of a plurality of monitoring agents situated at strategic locations on the network. The gathered data is analyzed by multi-layer analyzer 802. The analysis may be performed in OSI layers 1-7 or part thereof, using layer specific data analyzers 8023-8027. The skilled person will appreciate that layer 1 may be relevant only in hardware implementations. The skilled person will be aware that the present embodiment is merely exemplary and that different file transfer networks may use other transport models such as an encapsulated transport layer over the application layer.

Results from the layer specific analyzers preferably reach traffic state associator 8020 in disorganized fashion, meaning that results from different layers for different communication channels are all mixed up together. The traffic state associator determines which results belong together with which other results and traffic analysis results that correspond to any given communication channel are associated together by being assigned with a specific state channel. The data, thus arranged channel wise, preferably serves as input to the traffic analysis system 803 which is similar to the traffic analysis systems described above, and results from the traffic analysis system preferably serve as input to decision system 806 to be used in decision making regarding enforcement policy, for carrying out by the traffic control system 807.

It is noted that many of the elements specified hereinabove, may, be omitted partially or entirely from any specific implementation. For example: a specific application may omit the rule base or exchange it for a constant behavior logic.

It is pointed out that the above described embodiments, or variations thereof, are applicable to other similar fields, and not only to copyright protection, and protection of other sensitive or confidential material. For example, such a variation may be used to create automatic transcripts of communications over a virtual or high layer messaging network, where other communications which the law enforcement agency is not authorized to intercept i.e. other communication types, modes or communication between law abiding individuals are intercepted by a sniffing or like mechanism. That is to say the system could be used to inspect all transport on the network and report to the law enforcement agency only the information that it is authorized to intercept.

Other fields of application may include analysis of complex distributed system behavior, for example the debugging of shared memory used in a distributed system, or for networking research purposes.

The above embodiments thereby provide a powerful tool that can be used for other purposes as well: e.g., in order to monitor outgoing transport from a restricted zone such as a local area network of a corporate organization. The organization may be concerned that industrially sensitive information is being sent out via the network. In such a case, a system similar to the system illustrated in FIG. 1, with a database of signatures of confidential or otherwise restricted materials may be used in order to identify and possibly block the transport of the materials. Such an implementation is useful since the present peer-to-peer networks effectively create an alternative internet that renders many of the current standard firewall techniques ineffective.

The present embodiments, or variations thereof may also be used in combination with certifications methods and techniques in order to allow un-inspected, un-restricted or otherwise privileged usage to certificated users. Such certification is useful in reducing the load on the system.

The present invention may also be used in order to accumulate consumption statistics and/or other useful statistical analysis of the analyzed transport.

Figure 9:
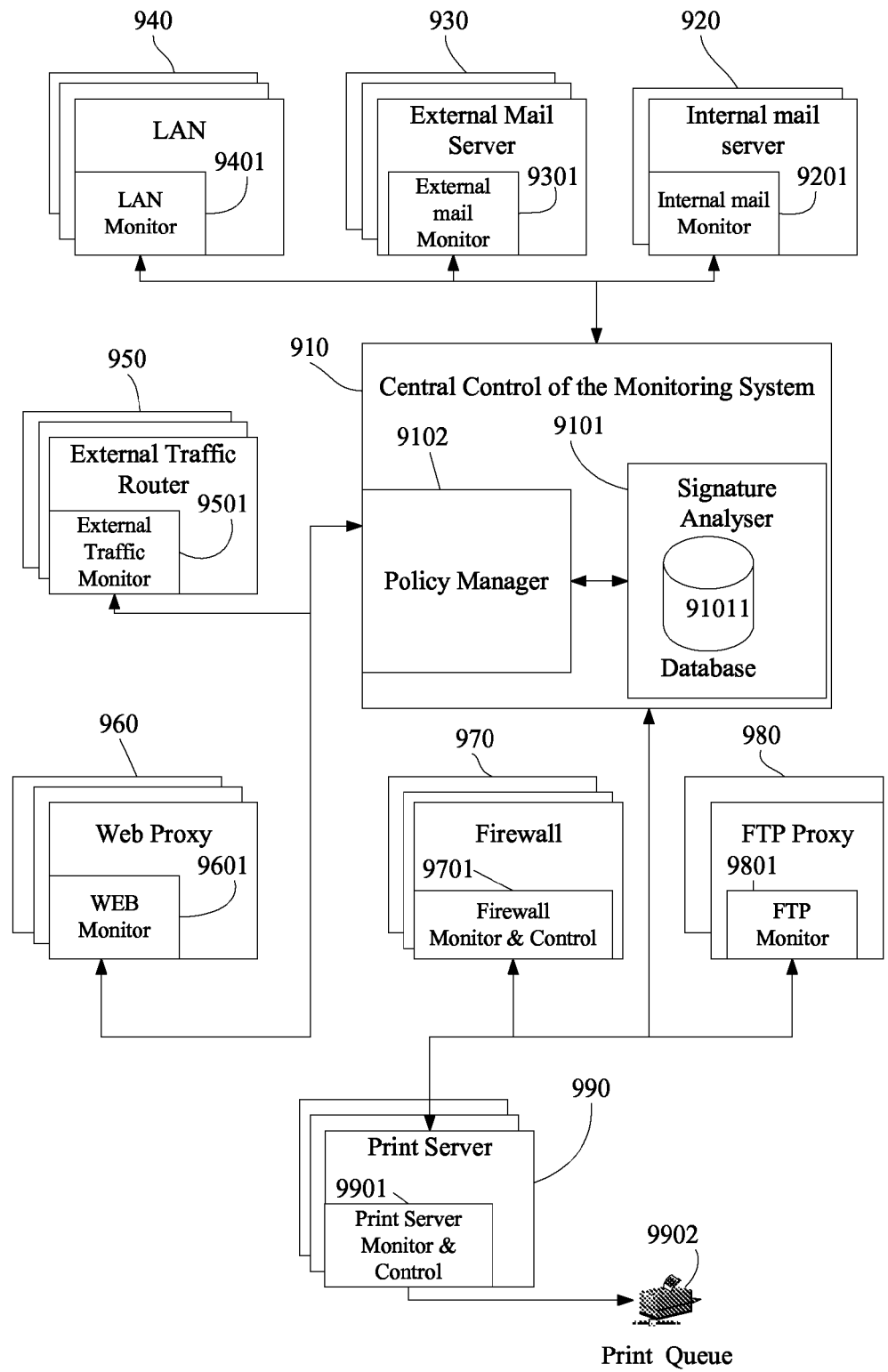
FIG. 9 is a simplified block diagram of a system for monitoring and control of content flow on a network according to a preferred embodiment of the present invention.

Reference is now made to FIG. 9, which is a simplified block diagram of a series of network elements and showing a system for controlling the distribution of predetermined content over a network, according to a preferred embodiment of the present invention. The system comprises a series of elements, including a central control 910, and one or more of the following inspection/monitoring points: an internal mail server 920, an external mail server 930, a LAN 940, an external traffic router 950, a web proxy 960, a firewall 970 and an FTP proxy 980. The system is able to monitor passing traffic at various of the above mentioned elements in the network. For example, while monitoring traffic within a corporate network, the system may monitor the traffic in one or more of the following entities: the external mail server 930 the external traffic router 950, the web proxy 960, the firewall 970, the FTP proxy 980 and the print server 990 etc. At each point, extracts of data may be obtained using respective monitors of the entity (9201, 9301, 9401, 9501, 9601, 9701, 9801 and 9901) Signatures are then extracted from the data in any of the ways explained above and transferred to the central control of the monitoring system 910. The signatures are then analyzed by the signature analyzer 9101 and compared with stored signatures to determine whether the monitored transport shows any significant level of correspondence with any of the content items represented by the stored signatures. The level of comparison may be determined by the policy manager 9102. It is pointed out that the correspondence does not have to be determined on the basis of individual signature comparison, e.g., multimedia content items are usually long, and individual parts of entirely unrelated items may be identical. However, in some of the more sensitive content items, even a relatively short portion of the content may be sensitive, and the policy manager should preferably contain information allowing the identification of such portions. Thus the comparison is preferably carried out in batch fashion or in serial cumulative fashion as described above. The output of the analysis and comparison is then used by the policy manager 9102 in order to determine which action will be taken: e.g., blocking transport, not allowing printing of the document, auditing, reducing available bandwidth, automatically sending a message to the offender, instructing, when possible, the monitoring entity (especially in the case of an E-mail server, and the various proxies), to change the content (e.g. to remove sensitive parts, reduce the quality of copyrighted material, to add a textual or other copyright warning, etc.) etc. . . .

In a preferred embodiment of the present invention, printer servers 990 and/or printers 9902 may include monitoring and control 9901 of printer jobs, preferably with an ability to block or modify printer jobs, in order to prevent unauthorized printing of sensitive documents.

Note that the concept of the atomic channel described above may consist of utilizing data from several such sources in order to form the information of such a specific channel. For example, peer-to-peer traffic may utilize Web, E-mail or FTP transport facilities for the actual transport, but may use TCP to search for files.

It is also pointed out that control, either direct as described in FIG. 9, or indirect through configuration or otherwise, of the firewall and similar entities (e.g., VPN server, etc.) may consist of instructing it to prevent circumvention of the other monitoring entities, e.g. force Web, E-mail and FTP traffic to use the monitored proxies and servers. Furthermore, encapsulated traffic that tries to circumvent those entities by the usage of encapsulation can be detected, and thereby blocked, monitored or redirected, by the multi-level inspection methods described above. In another embodiment of the present invention, the policy manager 9102 preferably instructs the monitoring entity to attempt to remove hidden messages (steganograms) by using methods that do not require the identification of the hidden messages to be removed. Such methods may be as simple as adding noise or other slight distortions to the content part of the file. A slight distortion of the content part of the file is generally sufficient to destroy the steganogram without affecting the legitimate content. Another method may comprise embedding a possibly random steganogram that renders any underlying original message unreadable.

Figure 10:
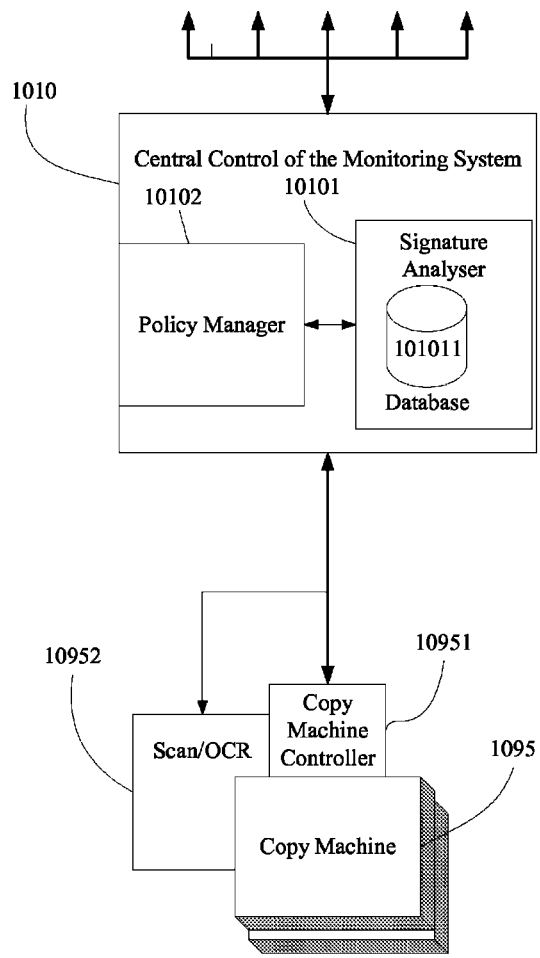
FIG. 10 is a simplified block diagram, similar to the one illustrated in FIG. 9, which also describes an interface to a photocopying machine according to a preferred embodiment of the present invention.

Reference is now made to FIG. 10, wherein there is illustrated a further embodiment of the system described in FIG. 9, specifically for preventing copying of classified documents using a photocopy machine. In this embodiment, a central control of a monitoring system 1010 is connected to a controller 10951 of copy machine 1095. Many modern copy machines contain a scanner that transforms the copied document into a digital image. The textual content of the document may be extracted from the digital image using a standard Optical Character Recognition (OCR) technique. After extraction, the textual content or derivatives thereof can be analyzed using a signature analyzer 10101 in order to determine whether the content comprises an unauthorized document. The output of the analysis is then used by a policy manager 10102 in order to determine whether to take action and if so, what action: e.g., not allowing photocopying of the document, auditing, sending a message to the offender, etc.

It is pointed out that signature extraction may be carried out in a centralized manner in the signature analyzer 9101/10101, or may alternatively be carried out in a distributed fashion, for example in the various monitors. The latter may advantageously reduce communications because the extracted signatures are smaller than the original content. Furthermore, signature caching and other similar methods may be carried out in the distributed entities to further reduce communication volume and thereby enhance performance.

Figure 11:
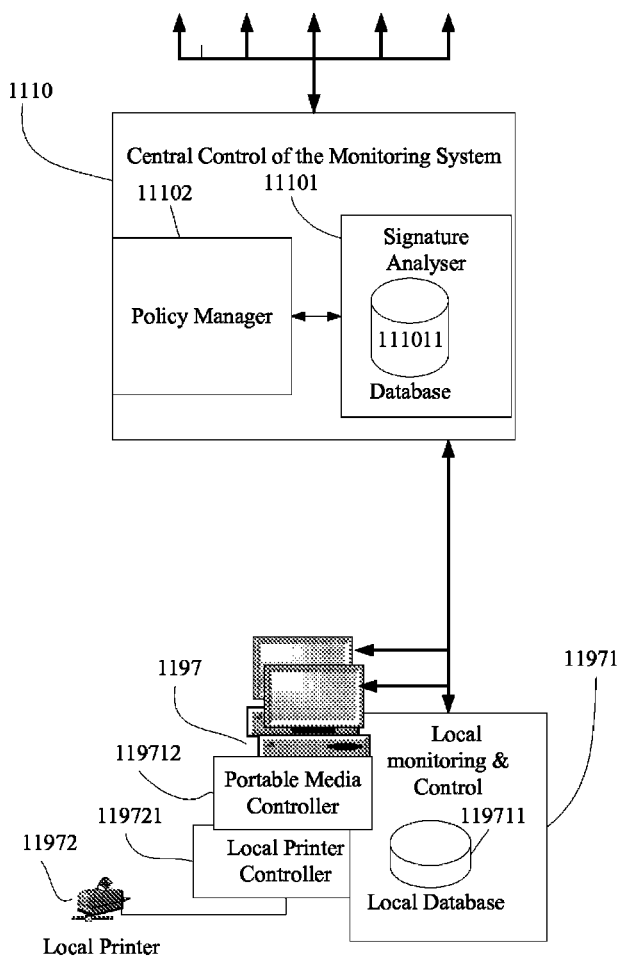
FIG. 11 is a simplified block diagram of another embodiment of the present invention, where at least part of the monitoring and control is performed in a distributed manner.

Reference is now made to FIG. 11, which is a simplified block diagram illustrating a further embodiment of the present invention which utilizes local monitoring and control located in user stations. The local monitor/control 11971 may be based on a software (or hardware) agent that resides within user stations 1197. The local monitor/control 11971 may include a local database 119711. In a preferred embodiment, the monitor may detect events such as printing, saving to portable media (e.g. diskettes), use of the "print screen" command etc...., and may analyze content sent (e.g., via the local printer controller 119721, via the portable media controller 119712, "print screen" controller etc....). If it turns out that there was an attempt at unauthorized printing or saving of unauthorized material to portable media etc...., then the local monitor & control 11971 unit may report the details to the central control 1110. The policy manager 11102 may thereafter select an action to be taken and may send a message, or other indication accordingly, to the local control 119711, which thereafter may use the controllers 119712 and 119721 in order to execute the policy. It is noted that in order to prevent malicious tampering with the locally based software agent referred to above, tamper resistance methods may be used. It is further noted that both hardware and software tamper resistance solutions are available. Generally, software solutions are the most easily manageable, however the hardware solutions are usually more robust.

It is noted that the distributed nature of the system may require automatic or pseudo-automatic updating of the distributed components.

It is further noted that encryption and authentication may be used in communications between elements in order to secure the communications.

It is appreciated that one or more steps of any of the methods described herein may be implemented in a different order than that shown, while not departing from the spirit and scope of the invention.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

A number of features have been shown in various combinations in the above embodiments. The skilled person will appreciate that the above combinations are not exhaustive, and all reasonable combinations of the above features are hereby included in the present disclosure.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for network content monitoring, comprising:
   at least one computer processor and a non-transitory electronically readable medium,
   a transport data monitor, connectable to a point in a network, and configured to monitor data being transported past said point,
   an encryption detector configured to determine whether said transport data is encrypted, said encryption detector comprises comprising a transport entropy measurement unit configured to measure entropy of said monitored transport data; and
   a policy determinator configured to use a rule-based decision making unit to select between a set of outputs including at least one of: removing sensitive parts of content, altering the content, and adding a message to the content, wherein said policy determinator is configured to use: an input of an amount of encrypted transport from a given user, and a confidence level based on said measured entropy of said monitored transport data, as factors in said rule based decision making.

2. A system according to claim 1, wherein said encryption detector is set to recognize a relatively high level of entropy as an indication that encrypted data is present.

3. A system according to claim 2 wherein said encryption detector is set to use a level of said measured entropy as a confidence level of said encrypted data indication.

4. The system of claim 1 further comprising a policy determinator configured to use a rule-based decision making unit to select between a set of outputs including at least some of: taking no action, performing auditing and stopping said transport.

5. The system of claim 1 further comprising a policy determinator configured to use rule-based decision making unit to select between a set of outputs including at least one of: taking no action, performing auditing preventing printing, and preventing of saving on a portable medium.

6. A system according to claim 1, comprised within a firewall.

7. A system according to claim 6, configured to define a restricted network zone within said network by inspecting data transport outgoing from said zone.

* * * * *